United States Patent
Bing-Wo et al.

(10) Patent No.: US 9,637,624 B2
(45) Date of Patent: May 2, 2017

(54) POLYMER COMPOSITIONS INCLUDING CELLULOSE ESTER

(75) Inventors: Ronald D. Bing-Wo, Waynesboro, VA (US); Robert Van De Kerkhof, Geneva (CH)

(73) Assignee: INVISTA NORTH AMERICA S.a.r.l., Wilmington, DE (US)

( * ) Notice: Subject to any disclaimer, the term of this patent is extended or adjusted under 35 U.S.C. 154(b) by 0 days.

(21) Appl. No.: 13/877,347

(22) PCT Filed: Oct. 5, 2011

(86) PCT No.: PCT/US2011/054882
§ 371 (c)(1),
(2), (4) Date: May 22, 2013

(87) PCT Pub. No.: WO2012/047971
PCT Pub. Date: Apr. 12, 2012

(65) Prior Publication Data
US 2014/0113995 A1    Apr. 24, 2014

Related U.S. Application Data

(60) Provisional application No. 61/390,859, filed on Oct. 7, 2010, provisional application No. 61/390,517, filed on Oct. 6, 2010.

(51) Int. Cl.
| | |
|---|---|
| C08L 77/00 | (2006.01) |
| C08L 75/04 | (2006.01) |
| C08L 23/00 | (2006.01) |
| C08J 5/18 | (2006.01) |
| C08L 23/02 | (2006.01) |
| C08K 5/29 | (2006.01) |
| C08L 1/08 | (2006.01) |
| C08L 1/10 | (2006.01) |
| C08L 1/14 | (2006.01) |

(52) U.S. Cl.
CPC .............. C08L 23/00 (2013.01); C08J 5/18 (2013.01); C08L 23/02 (2013.01); C08L 75/04 (2013.01); C08L 77/00 (2013.01); *C08J 2323/00* (2013.01); *C08J 2367/00* (2013.01); *C08J 2375/04* (2013.01); *C08J 2377/00* (2013.01); *C08J 2401/10* (2013.01); *C08K 5/29* (2013.01); *C08L 1/08* (2013.01); *C08L 1/10* (2013.01); *C08L 1/14* (2013.01)

(58) Field of Classification Search
CPC .......... C08L 77/00; C08L 75/04; C08L 23/00
USPC ................... 524/40, 35, 37, 39, 41
See application file for complete search history.

(56) References Cited

U.S. PATENT DOCUMENTS

| | | | |
|---|---|---|---|
| 938,003 A * | 10/1909 | Hite | E01B 3/32 |
| | | | 238/375 |
| 4,427,809 A | 1/1984 | Alberts et al. | |
| 4,990,186 A * | 2/1991 | Jones | C09D 11/36 |
| | | | 106/31.37 |
| 6,001,484 A | 12/1999 | Horrion et al. | |

FOREIGN PATENT DOCUMENTS

| | | | |
|---|---|---|---|
| EP | 2093162 | * | 8/2009 |
| JP | 2005048306 A | | 2/2005 |
| WO | 2010111088 A2 | | 9/2010 |

OTHER PUBLICATIONS

Richard J. Lewis Jr., Hawley's Condensed Chemical Dictionary, Van Nostrand Reinhold Publishing, 13$^{th}$ edition, p. 228.*

* cited by examiner

*Primary Examiner* — Jim J Seidleck
*Assistant Examiner* — Deve E Valdez
(74) *Attorney, Agent, or Firm* — Bridget C. Sciamanna

(57) ABSTRACT

Included are polymer compositions including a polymer and about 0.1% to 25% by weight of a cellulose additive. The polymer composition is in the form of a film and the cellulose additive may be a cellulose ester such as cellulose acetate butyrate.

10 Claims, No Drawings

POLYMER COMPOSITIONS INCLUDING CELLULOSE ESTER

FIELD OF THE INVENTION

The present invention relates to a polymer composition including a cellulose additive composition.

BACKGROUND

The major function of absorbent articles, such as disposable diapers and adult incontinent briefs, is to absorb and contain body exudates. One common mode of failure for such products occurs when body exudates leak out of the gaps between the article and the wearer's leg and/or waist to adjacent clothing because they are not immediately absorbed within the article. As such, contemporary absorbent articles typically contain stretchable materials in the waist, side and cuff regions to provide sustained fit and a good seal of the article to the wearer's body.

One known technique for providing such stretchable materials is the incorporation of yarns, strands, films or nonwoven fibrous webs made of elastomeric materials. Typically, such materials are stretchable in at least one, and possibly multiple, directions.

SUMMARY

Any of the polymer compositions described herein may be in any suitable form such as a solution, melt, pellets, film, fiber, etc.

Briefly described, embodiments of this disclosure include a polymer composition containing a cellulose composition incorporated into the polymer composition. The composition may be in any suitable form such as a solution, melt, pellets, film, fiber, etc.

One exemplary polymer composition, among others, includes: polyurethane or polyurethaneurea and about 0.1% to 25% by weight of the cellulose additive such as a cellulose ester. In an embodiment, the cellulose additive composition includes a cellulose ester such as cellulose butyrate, cellulose propionate, an acetyl cellulose selected from the group consisting of cellulose acetate butyrate, cellulose acetate propionate, cellulose acetate phthalate and mixtures thereof. When the composition is a fiber, the elastic fiber further comprising at least one additional additive selected from the group consisting of calcium stearate, magnesium stearate, organic stearates, silicon oil, mineral oil, and mixtures thereof. In addition, an embodiment of the present disclosure includes a fabric including an elastic fiber or polymer composition as described herein. In addition, an embodiment of the present disclosure includes a laminate including an elastic fiber as described herein. In addition, an embodiment of the present disclosure includes a garment including an elastic fiber or polymer composition as described herein.

The polymer compositions of some embodiments may provide a variety of benefits to the articles into which they are formed, such as fibers and films. The benefits may include reduced tack and maintained or enhanced gluing properties.

DETAILED DESCRIPTION

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features that may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, fabrics, textiles, and the like, which are within the skill of the art. Such techniques are fully explained in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmospheres. Standard temperature and pressure are defined as 25° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Definitions

As used herein, the term "anti-tack agent" or "anti-tack additive" refers to an additive or agent used in fiber preparation. In an embodiment, the anti-tack agent can reduce tackiness of polymer filaments or polymer films.

As used herein, the term "soluble" as applied to anti-tack agents refers to the ability of the anti-tack agent to dissolve in typical solvents used for spandex spinning, including but not limited to, dimethyl acetamide (DMAc), dimethyl formamide (DMF), and N-methyl pyrrolidone (NMP).

As used herein, the term "fiber" refers to filamentous material that can be used in fabric and yarn as well as textile fabrication. One or more fibers can be used to produce a fabric or yarn. The yarn can be fully drawn or textured according to methods known in the art.

As used herein, "spandex" refers to synthetic fiber in which the fiber-forming substance is a long chain synthetic elastomer comprised of about 85% or more by weight of a segmented polyurethane, where polyurethaneureas are considered a sub-class of such polyurethanes. Such a synthetic fiber may be wound on a cylindrical core to form a supply package. Spandex compositions may be prepared by a wet-spinning or a dry-spinning process and can have any of a variety of cross-sections such as a round cross-section or a flat "tape-like" cross section. Alternatively, a polyurethane solution can be cast and dried to form a "tape" configuration.

As used herein, "film" refers to a shaped article, i.e., articles formed from the polymer compositions herein, that is substantially two-dimensional in that the dimensions of length and width are each greater than the thickness of the article. Examples include, without limitation, films, sheets, and tapes, among others.

Discussion

Embodiments of the present disclosure provide for a polymer composition containing a cellulose ester additive, where the cellulose ester is incorporated into the composition, methods of preparing the composition, methods of using this composition, laminates including the composition, fabrics including the composition, garments, textiles including the composition, and the like.

Embodiments of the present disclosure include a cellulose ester. The cellulose ester that is chosen will depend on the polymer in the article, the melting temperature of the cellulose ester (100-250° C.) and the number average molecular weight of the cellulose ester (5000-150,000). Examples of suitable celluolose esters include, without limitation, is cellulose butyrate (CB), cellulose propionate, cellulose acetate butyrate (CAB), cellulose acetate phthalate and/or cellulose acetate propionate (CAP). In an embodiment, the cellulose ester can include an additional additive such as calcium stearate, magnesium stearate, organic stearates, silicon oil, mineral oil, and mixtures thereof. These compositions are added to the polymer composition such as polyurethane or polyurethaneurea polymer, prior to further processing of the composition such as spinning of the fiber or casting or extruding a film.

Although the cellulose additive has been identified as providing the benefit of anti-tack without reducing gluing properties, or enhancing gluing properties (such as by reducing the amount of glue necessary for adhesion) it is recognized that other classes of materials may provide a similar benefit and can be included with the cellulose additive of the present disclosure.

Polymer compositions utilized in the present invention may include materials capable of being extruded or cast as films such as polyolefins (including elastomeric polyolefins), nylons, polyesters, and the like. Such polymers can be thermoplastic materials such as polyethylene, low density polyethylene, linear low density polyethylene, polypropylenes and copolymers and blends containing substantial fractions of these materials. The products prepared from the polymer compositions, such as fibers or films, can be treated with surface modifying agents to impart hydrophilic or hydrophobic properties, such as imparting a lotus effect. For example, polymer containing articles such as films can be textured, embossed, or otherwise altered from a strictly flat, planar configuration.

In an embodiment, the polymer composition of the present disclosure comprises a polymer such as polyurethane or polyurethaneurea, among others and a substituted cellulose, as well as one or more additives. Acetyl cellulose can include, but is not limited to, cellulose acetate butyrate, cellulose acetate propionate, and mixtures thereof. In an embodiment, the acetyl cellulose can be cellulose acetate. Cellulose butyrate may also be used. Suitable additives include, but are not limited to, calcium stearate, magnesium stearate, organic stearates, mineral oil, silicon oil, and mixtures thereof. In other embodiments, the polymer composition may or may not include a finish such as a spin finish. In certain embodiments, the polymer composition or cellulose ester composition may include at least one additional particulate anti-tack agent in addition to the compounds, (e.g., an acetyl cellulose or other substituted cellulose) noted herein.

In an embodiment, the polymer composition of the present disclosure includes, for example, about 0.1% to 1.0%, about 0.1% to 5%, about 0.1% to 10.0%, about 0.1% to 15.0%, about 0.1% to 20%, about 0.1% to 25%, about 0.1% to 50.0%, about 0.5% to about 5.0% and about 1.0% to 5.0% substituted cellulose by weight of the polymer composition.

In an embodiment, the cellulose ester of the present disclosure is or includes cellulose acetate butyrate. The cellulose acetate butyrate may contain, for example, about 5% to 90%, about 20% to 30%, about 30% to 40%, about 40% to 50%, about 50% to 60%, about 60% to 70%, about 70% to 80%, or about 80% to 90% weight percent butyryl content. Alternatively, the composition can be a cellulose butyrate where the butyryl content is up to and including approximately 100%, which would be a cellulose butyrate.

In an embodiment, the acetyl cellulose of the present disclosure is cellulose acetate propionate. In an embodiment, the cellulose acetate propionate may contain, for example, about 5% to 90%, about 20% to 30%, about 30% to 40%, about 40% to 50%, about 50% to 60%, about 60% to 70%, about 70% to 80%, or about 80% to 90% weight percent propionyl content.

In an embodiment, the polymer composition of the present disclosure includes an additional additive. In an embodiment, the additive may contain about 0.1% to 1.0%, about 0.1% to 2.0%, about 0.1% to 3.0%, about 0.1% to 4.0%, about 0.1% to 5.0%, about 0.1% to 6.0%, about 0.1% to 7.0%, about 0.1% to 8.0%, about 0.1% to 9.0%, or about 0.1% to 10.0% of an additive (e.g., a stearate, a silicon oil or a mineral oil).

In an embodiment, the viscosity of the silicon oil or mineral oil may be, for example, from about 1 centistoke to 200 centistokes, about 5 centistokes to 150 centistokes, about 10 centistokes to 100 centistokes, or about 20 centistokes to 50 centistokes.

In an embodiment, the polymer composition of the present disclosure comprises a polymer such as polyurethane or polyurethaneurea, among others and about 0.5% to 25% by weight of cellulose acetate butyrate, with about 35% to 57% by weight butyryl content, or about 50% to 57% by weight butyryl content. Embodiments of the elastic fiber may contain a further additive, such as calcium stearate, magnesium stearate, organic stearate, silicon oil, mineral oil, and mixtures thereof. In certain embodiments, the elastic fiber excludes a spin finish. The elastic fiber of the present disclosure may include a spin finish which includes about 0.5% to 7.0% of a topically applied mineral oil or silicon oil or mixtures containing mineral oil or silicon oil by weight of the final fiber (i.e., weight once applied).

Embodiments of the present disclosure include a process for preparing any one of the polymer compositions as described herein. The process comprises preparing a composition including at least one polyolefin, polyamide (nylon), polyester, polyurethane, a polyurethaneurea, or mixtures thereof. Next the process includes adding a substituted cellulose to the composition. Next, the process includes preparing a fiber or film from the composition by a spinning process (e.g., wet spinning, dry spinning, and melt spinning) or by casting or extruding the polymer composition.

In an embodiment, the polymers used to create the polymer compositions of the present disclosure may generally be prepared by capping a macromolecular glycol with, for example, a diisocyanate, then dissolving the resulting capped glycol in a suitable solvent (e.g., dimethylacetamide (DMAc), N-methylpyrrolidone, dimethylformamide, and the like), and chain-extending the capped glycol with chain extenders such as diols to form polyurethanes, or diamines to form polyurethaneureas. Polyurethaneurea compositions useful for preparing fiber or long chain synthetic polymers include at least 85% by weight of a segmented polyurethane. Typically, these include a polymeric glycol which is reacted with a diisocyanate to form an NCO-terminated prepolymer (a "capped glycol"), which is then dissolved in a suitable solvent, such as dimethylacetamide, dimethylformamide, or N-methylpyrrolidone, and secondarily reacted with a difunctional chain extender.

Polyurethanes are formed in a second step when the chain extenders are diols (and may be prepared without solvent). Polyurethaneureas, a sub-class of polyurethanes, are formed when the chain extenders are diamines. In the preparation of a polyurethaneurea polymer which can be spun into spandex, the glycols are extended by sequential reaction of the hydroxy end groups with diisocyanates and one or more diamines. In each case, the glycols must undergo chain extension to provide a polymer with the necessary properties, including viscosity. If desired, dibutyltin dilaurate, stannous octoate, mineral acids, tertiary amines such as triethylamine, N,N'-dimethylpiperazine, and the like, and other known catalysts can be used to assist in the capping step.

In an embodiment, suitable polymeric glycol components include, but are not limited to, polyether glycols, polycarbonate glycols, and polyester glycols of number average molecular weight of about 600 to 3,500. Mixtures of two or more polymeric glycol or copolymers can be included.

In an embodiment, examples of polyether glycols that can be used include, but are not limited to, those glycols with two hydroxyl groups, from ring-opening polymerization and/or copolymerization of ethylene oxide, propylene oxide, trimethylene oxide, tetrahydrofuran, and 3-methyltetrahydrofuran, or from condensation polymerization of a polyhydric alcohol, such as a diol or diol mixtures, with less than 12 carbon atoms in each molecule, such as ethylene glycol, 1,3-propanediol, 1,4-butanediol, 1,5-pentanediol 1,6-hexanediol, 2,2-dimethyl-1,3 propanediol, 3-methyl-1,5-pentanediol, 1,7-heptanediol, 1,8-octanediol, 1,9-nonanediol, 1,10-decanediol and 1,12-dodecanediol. A poly (tetramethylene ether) glycol of molecular weight of about 1,700 to about 2,100, such as Terathane® 1800 (INVISTA of Wichita, Kans.) with a functionality of 2, is an example of a specific suitable glycol. Co-polymers can include poly (tetramethylene-co-ethyleneether) glycol.

In an embodiment, examples of polyester polyols that can be used include, but are not limited to, those ester glycols with two hydroxyl groups, produced by condensation polymerization of aliphatic polycarboxylic acids and polyols, or their mixtures, of low molecular weights with no more than 12 carbon atoms in each molecule. Examples of suitable polycarboxylic acids include, but are not limited to, malonic acid, succinic acid, glutaric acid, adipic acid, pimelic acid, suberic acid, azelaic acid, sebacic acid, undecanedicarboxylic acid, and dodecanedicarboxylic acid. Examples of suitable polyols for preparing the polyester polyols include, but are not limited to, ethylene glycol, 1,3-propanediol, 1,4-butanediol, 1,5-pentanediol 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. A linear bifunctional polyester polyol with a melting temperature of about 5° C. to 50° C. is an example of a specific polyester polyol.

In an embodiment, examples of polycarbonate polyols that can be used include, but are not limited to, those carbonate glycols with two or more hydroxy groups, produced by condensation polymerization of phosgene, chloroformic acid ester, dialkyl carbonate or diallyl carbonate and aliphatic polyols, or their mixtures, of low molecular weights with no more than 12 carbon atoms in each molecule. Examples of suitable polyols for preparing the polycarbonate polyols include, but are not limited to, diethylene glycol, 1,3-propanediol, 1,4-butanediol, 1,5-pentanediol, 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. A linear, bifunctional polycarbonate polyol with a melting temperature of about 5° C. to about 50° C. is an example of a specific polycarbonate polyol.

In an embodiment, the diisocyanate component can also include a single diisocyanate or a mixture of different diisocyanates including an isomer mixture of diphenylmethane diisocyanate (MDI) containing 4,4'-methylene bis(phenyl isocyanate) and 2,4'-methylene bis(phenyl isocyanate). Any suitable aromatic or aliphatic diisocyanate can be included. Examples of diisocyanates that can be used include, but are not limited to, 4,4'-methylene bis(phenyl isocyanate), 2,4'-methylene bis(phenyl isocyanate), 4,4'-methylenebis(cyclohexyl isocyanate), 1,3-diisocyanato-4-methyl-benzene, 2,2'-toluenediisocyanate, 2,4'-toluenediisocyanate, and mixtures thereof.

In an embodiment, a chain extender may be either water or a diamine chain extender for a polyurethaneurea. Combinations of different chain extenders may be included depending on the desired properties of the polyurethaneurea and the resulting fiber. Examples of suitable diamine chain extenders include, but are not limited to: hydrazine; 1,2-ethylenediamine; 1,4-butanediamine; 1,2-butanediamine; 1,3-butanediamine; 1,3-diamino-2,2-dimethylbutane; 1,6-hexamethylenediamine; 1,12-dodecanediamine; 1,2-propanediamine; 1,3-propanediamine; 2-methyl-1,5-pentanediamine; 1-amino-3,3,5-trimethyl-5-aminomethylcyclohexane; 2,4-diamino-1-methylcyclohexane; N-methylamino-bis(3-propylamine); 1,2-cyclohexanediamine; 1,4-cyclohexanediamine; 4,4'-methylene-bis(cyclohexylamine); isophorone diamine; 2,2-dimethyl-1,3-propanediamine; meta-tetramethylxylenediamine; 1,3-diamino-4-methylcyclohexane; 1,3-cyclohexane-diamine; 1,1-methylene-bis(4,4'-diaminohexane); 3-aminomethyl-3,5,5-trimethylcyclohexane; 1,3-pentanediamine (1,3-diaminopentane); m-xylylene diamine; and Jeffamine® (Texaco).

When a polyurethane is desired, the chain extender is a diol. Examples of such diols that may be used include, but are not limited to, ethylene glycol, 1,3-propanediol, 1,2-propylene glycol, 3-methyl-1,5-pentanediol, 2,2-dimethyl-1,3-propanediol, 2,2,4-trimethyl-1,5-pentanediol, 2-methyl-2-ethyl-1,3-propanediol, 1,4-bis(hydroxyethoxy)benzene, and 1,4-butanediol, hexanediol and mixtures thereof.

In an embodiment, a monofunctional alcohol or a primary/secondary monofunctional amine may optionally be included to control the molecular weight of the polymer. Blends of one or more monofunctional alcohols with one or more monofunctional amines may also be included. Examples of monofunctional alcohols useful with the present disclosure include, but are not limited to, at least one member selected from the group consisting of aliphatic and cycloaliphatic primary and secondary alcohols with 1 to 18 carbons, phenol, substituted phenols, ethoxylated alkyl phenols and ethoxylated fatty alcohols with molecular weight less than about 750, including molecular weight less than 500, hydroxyamines, hydroxymethyl and hydroxyethyl substituted tertiary amines, hydroxymethyl and hydroxyethyl substituted heterocyclic compounds, and combinations thereof, including furfuryl alcohol, tetrahydrofurfuryl alcohol, N-(2-hydroxyethyl)succinimide, 4-(2-hydroxyethyl) morpholine, methanol, ethanol, butanol, neopentyl alcohol, hexanol, cyclohexanol, cyclohexanemethanol, benzyl alcohol, octanol, octadecanol, N,N-diethylhydroxylamine, 2-(diethylamino)ethanol, 2-dimethylaminoethanol, and 4-piperidineethanol, and combinations thereof. Examples of suitable mono-functional dialkylamine blocking agents include, but not limited to: N,N-diethylamine, N-ethyl-N-propylamine, N,N-diisopropylamine, N-tert-butyl-N-methylamine, N-tert-butyl-N-benzylamine, N,N-dicyclohexylamine, N-ethyl-N-isopropylamine, N-tort-butyl-N-isopropylamine, N-isopropyl-N-cyclohexylamine, N-ethyl-N-cyclohexylamine, N,N-diethanolamine, and 2,2,6,6-tetramethylpiperidine.

In an embodiment, after synthesizing the polymer solution of the present disclosure, cellulose ester is incorporated into the solution. The solution having the cellulose ester dispersed therein may be dry-spun to form an elastic fiber of the present disclosure. Dry-spinning refers to the process of forcing a polymer solution through spinneret orifices into a shaft to form a filament. Heated inert gas is passed through the chamber, evaporating the solvent from the filament as the filament passes through the shaft. The resulting elastic fiber may then be wound on a cylindrical core to form a spandex supply package. A wet-spinning process may also be used as well as the casting and drying of the polymer solution.

In an embodiment, the polymer compositions of the present disclosure may contain an additional, conventional additive that are added for specific purposes, such as antioxidants, thermal stabilizers, UV stabilizers, pigments and delusterants (for example titanium dioxide), dyes and dye enhancers, lubricating agents (for example silicone oil), additives to enhance resistance to chlorine degradation (for example zinc oxide; magnesium oxide and mixtures of huntite and hydromagnesite), and the like, so long as such additives do not produce antagonistic effects with the spandex elastomer or anti-tack additive of this disclosure. Some of the conventional additives, such as titanium dioxide, exhibit small effects on over-end take-off tension (OETOT) measurements, the parameter used to judge tackiness of the elastic fiber (as described below in the Examples), but none of them has an appreciable effect on the OETOT measurements and are not added to the spandex in amounts so as to reduce tackiness.

Embodiments of the present disclosure include articles of manufacture comprising the polymer compositions of the present disclosure. These articles of manufacture include, but are not limited to, a fabric and a laminate structure.

In an embodiment, the present disclosure provides a fabric comprising a polymer composition which contains polyurethane or polyurethaneurea and about 0.1% to 25% by weight of cellulose acetate butyrate. An additional additive may be included, such as calcium stearate, magnesium stearate, organic stearate, silicon oil, mineral oil, and mixtures thereof.

In an embodiment, the laminate structure comprises an elastic fiber or elastomeric film of the present disclosure which has a polyurethane or polyurethaneurea, about 0.1% to 25% by weight of cellulose acetate butyrate and at least one additional additive, such as calcium stearate, magnesium stearate, organic stearate, silicon oil, mineral oil, and mixtures thereof. In certain embodiments, the fiber is adhered to one or more layers of a substrate, such as a fabric, nonwoven, film, and combinations thereof. The laminate structure may be adhered by an adhesive, ultrasonic bonding, thermal bonding or combinations thereof. The laminate structure may comprise a disposable hygiene article such as diapers, training pants, adult incontinence articles, or feminine hygiene articles.

Many variations and modifications may be made to the above-described embodiments. All such modifications and variations are intended to be included herein within the scope of this disclosure and protected by the following claims.

We claim:

1. A polymer composition for an absorbent article consisting of a polymer and about 0.1% to 25% by weight of a cellulose ester,
    wherein the polymer is selected from the group consisting of polyolefins, polyurethanes, polyurethaneureas, nylons, polyesters, and mixtures thereof, and
    wherein the cellulose ester is selected from the group consisting of a cellulose propionate, cellulose acetate phthalate, and mixtures thereof.

2. An absorbent article which consists of the polymer composition of claim 1.

3. The polymer composition of claim 1, wherein the polymer is selected from the group consisting of polyolefins, nylons, polyesters and mixtures thereof.

4. The polymer composition of claim 3, wherein the polymer is selected from the group consisting of polyolefins, nylons and mixtures thereof.

5. The absorbent article of claim 2, wherein the polymer is selected from the group consisting of polyolefins, nylons, polyesters and mixtures thereof.

6. The absorbent article of claim 5, wherein the polymer is selected from the group consisting of polyolefins, nylons and mixtures thereof.

7. The absorbent article of claim 2, wherein the absorbent article is a hygiene article.

8. The absorbent article of claim 7, wherein the hygiene article is diapers, training pants, adult incontinence articles or feminine hygiene articles.

9. A method for preparing a film with reduced tack and maintained or enhanced gluing properties comprising the step of forming the polymer composition of claim 1 into said film.

10. The method of claim 9, wherein said forming step is selected from the group consisting of casting and extruding.

\* \* \* \* \*